United States Patent
Jeong et al.

(10) Patent No.: US 10,243,257 B2
(45) Date of Patent: Mar. 26, 2019

(54) PORTABLE ELECTRONIC DEVICE COVER

(71) Applicant: Samsung Electronics Co., Ltd., Gyeonggi-do (KR)

(72) Inventors: Wonseok Jeong, Gyeonggi-do (KR); Donghwan Kim, Gyeonggi-do (KR); Bumjin Cho, Gyeonggi-do (KR); Donguk Choi, Gyeonggi-do (KR); Sangmin Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 88 days.

(21) Appl. No.: 15/038,848

(22) PCT Filed: Nov. 27, 2014

(86) PCT No.: PCT/KR2014/011457
§ 371 (c)(1),
(2) Date: May 24, 2016

(87) PCT Pub. No.: WO2015/080479
PCT Pub. Date: Jun. 4, 2015

(65) Prior Publication Data
US 2016/0380335 A1  Dec. 29, 2016

(30) Foreign Application Priority Data

Nov. 27, 2013 (KR) .................. 10-2013-0145604

(51) Int. Cl.
*H01Q 1/24* (2006.01)
*H01Q 9/42* (2006.01)
(Continued)

(52) U.S. Cl.
CPC ............. *H01Q 1/243* (2013.01); *H01Q 1/245* (2013.01); *H01Q 1/50* (2013.01); *H01Q 9/0414* (2013.01);
(Continued)

(58) Field of Classification Search
CPC .......... H01Q 1/24; H01Q 1/241; H01Q 1/242; H01Q 1/243; H01Q 1/245; H01Q 1/40;
(Continued)

(56) References Cited

U.S. PATENT DOCUMENTS

| | | | |
|---|---|---|---|
| 8,648,752 B2 * | 2/2014 | Ramachandran | ........ H01Q 1/24 343/700 MS |
| 8,774,716 B2 * | 7/2014 | Chan | .................... H04B 5/0062 235/492 |

(Continued)

FOREIGN PATENT DOCUMENTS

| EP | 1 870 956 | 12/2007 |
|---|---|---|
| EP | 2 192 652 | 6/2010 |

(Continued)

OTHER PUBLICATIONS

PCT/ISA/210 Search Report issued on PCT/KR2014/011457 (pp. 3).

(Continued)

*Primary Examiner* — Tho G Phan
*Assistant Examiner* — Patrick Holecek
(74) *Attorney, Agent, or Firm* — The Farrell Law Firm, P.C.

(57) ABSTRACT

A portable electronic device cover, according to the present invention, comprises a conductive plate which is spaced at a predetermined distance from an antenna mounted in a portable electronic device and is arranged at a position overlapped with at least a part of the antenna when the portable electronic device is mounted in the portable electronic device cover.

9 Claims, 6 Drawing Sheets

(51) Int. Cl.
*H01Q 1/50* (2006.01)
*H01Q 9/04* (2006.01)
*H04B 1/3888* (2015.01)
*H04M 1/02* (2006.01)

(52) U.S. Cl.
CPC .............. *H01Q 9/42* (2013.01); *H04B 1/3888* (2013.01); *H04M 1/026* (2013.01)

(58) Field of Classification Search
CPC ................... H01Q 1/421; H01Q 1/405; H01Q 9/04–9/46; H01Q 1/50
USPC ........................................ 343/702, 872, 873
See application file for complete search history.

(56) References Cited

U.S. PATENT DOCUMENTS

| | | | |
|---|---|---|---|
| 9,153,857 B2* | 10/2015 | Teng | H01Q 1/243 |
| 2007/0296638 A1 | 12/2007 | Kim et al. | |
| 2009/0052654 A1 | 2/2009 | Hyun et al. | |
| 2010/0137042 A1* | 6/2010 | Na | H01Q 1/243 |
| | | | 455/575.5 |
| 2011/0248895 A1 | 10/2011 | Bungo et al. | |
| 2011/0294542 A1 | 12/2011 | Ray et al. | |
| 2012/0071214 A1 | 3/2012 | Ash, Jr. et al. | |
| 2012/0206303 A1* | 8/2012 | Desclos | H01Q 1/243 |
| | | | 343/702 |
| 2013/0109435 A1 | 5/2013 | McCaughey et al. | |

FOREIGN PATENT DOCUMENTS

| | | |
|---|---|---|
| EP | 2 375 489 | 10/2011 |
| KR | 1020070122101 | 12/2007 |
| KR | 101203773 | 11/2012 |
| KR | 1020130037119 | 4/2013 |
| KR | 1020130097954 | 9/2013 |

OTHER PUBLICATIONS

PCT/ISA/237 Written Opinion issued on PCT/KR2014/011457 (pp. 7).
European Search Report dated Jun. 28, 2017 issued in counterpart application No. 14865401.5-1927, 8 pages.

* cited by examiner

| | EGSM | | |
|---|---|---|---|
| | Efficiency [%] | TRP [Bm] | Tis [dBm] |
| CASE IN WHICH COVER IS NOT MOUNTED | 21.3 | 27.2 | -103.5 |
| CASE IN WHICH ONLY COVER IS MOUNTED | 8.8 | 24.1 | 97.4 |
| CONVENTIONAL ART | 10.5 | 24.5 | 98.2 |
| CASE IN WHICH COVER INCLUDING CONDUCTIVE PLATE IS MOUNTED | 14.0 | 24.4 | -99.9 |

FIG. 5

(Efficiency: %)

| CONDUCTIVE PLATE FORM | | GSM | EGSM | DCS | WCDMA 1 |
|---|---|---|---|---|---|
| 1 |  | 14.6 | 8.8 | 28.9 | 39.9 |
| 2 |  | 14.2 | 14 | 28.9 | 38.6 |
| 3 |  | 15 | 13.7 | 30.8 | 40 |
| 4 |  | 15.5 | 11.6 | 30.1 | 40.2 |
| 5 |  | 15.4 | 10.4 | 31.7 | 40.6 |
| 6 |  | 15.2 | 9.6 | 31.2 | 39.8 |
| 7 |  | 14.9 | 9.1 | 31.7 | 40.3 |

PORTABLE ELECTRONIC DEVICE COVER

PRIORITY

This application is a National Phase Entry of PCT International Application No. PCT/KR2014/011457, which was filed on Nov. 27, 2014, and claims priority to Korean Patent Application No. 10-2013-0145604, which was filed on Nov. 27, 2013, the contents of each of which are incorporated herein by reference.

TECHNICAL FIELD

The present invention relates to a portable electronic device cover.

BACKGROUND ART

Nowadays, with remarkable development of information and communication technology and semiconductor technology, spread and use of portable electronic devices rapidly increases and portable electronic devices are now very widely used. As a portable electronic device, a smart phone having various additional functions such as web surfing as well as communication information transmission and reception is widely used.

While such a portable electronic device exhibits the relatively same or more advanced performance as well as a function thereof, an entire size and design of the portable electronic device are an important factor for satisfying a consumer's desire, and for this reason, a producer of the portable electronic device seeks a small size and a thin thickness while implementing the same function or an advanced performance.

Particularly, as an antenna device, an external antenna device such as an initial rod antenna device or helical antenna device has been used, but when the portable electronic device drops, the external antenna device becomes a weakest portion and deteriorates portability and thus a built-in antenna device has been recently used.

In order to protect components mounted at the inside and the outside of the portable electronic device from an external impact and a friction, a portable electronic device cover has been widely used as an accessory. Nowadays, such a portable electronic device cover performs a function as an auxiliary battery for charging the portable electronic device as well as a function of protecting the portable electronic device from an external impact and enables the portable electronic device to perform a new function when mounting the portable electronic device cover in the portable electronic device.

However, despite the function of the portable electronic device cover, when the portable electronic device cover is mounted in the portable electronic device, a problem exists that the portable electronic device cover deteriorates a performance of an antenna device housed in the portable electronic device. For this reason, a producer of the portable electronic device designs the portable electronic device to maximize a radiation performance of the antenna device in a state in which the portable electronic device cover is not mounted in the portable electronic device. However, when the portable electronic device cover is mounted in the portable electronic device, a characteristic, for example, a resonant frequency band of the antenna device is changed due to the portable electronic device cover and thus a radiation performance of the antenna device may be deteriorated.

In order to solve the problem, conventionally, by providing a physical space by forming a groove at a portable electronic device cover surface that contacts with the portable electronic device and by separating the portable electronic device cover and the antenna device, a method of reducing an influence due to the portable electronic device cover has been used.

DISCLOSURE OF INVENTION

Technical Problem

A method of providing a physical space in a portable electronic device cover as the conventional art has a limitation due to a spatial restriction within the portable electronic device cover, and by providing a physical space, a cover design may be deteriorated.

The present invention has been made in view of the above problems and provides a portable electronic device cover that improves a performance of an antenna device mounted within a portable electronic device while preventing damage and maintaining a design of the portable electronic device as an intrinsic function of the portable electronic device cover.

Solution to Problem

In accordance with an aspect of the present invention, a portable electronic device cover includes: a conductive plate separated by a predetermined distance from an antenna mounted in a portable electronic device and disposed at a location overlapped with at least a portion of the antenna, when the portable electronic device is mounted in the portable electronic device cover.

Advantageous Effects of Invention

A portable electronic device cover according to various exemplary embodiments of the present invention improves a performance of an antenna device mounted within a portable electronic device, thereby providing excellent usability.

MODE OF THE INVENTION

Hereinafter, various exemplary embodiments of the present invention will be described in detail with reference to the accompanying drawings. The same reference numbers are used throughout the drawings to refer to the same or like parts. Further, detailed descriptions of well-known functions and structures incorporated herein may be omitted to avoid obscuring the subject matter of the present invention. In the following description, only a portion necessary for understanding operation according to various exemplary embodiments of the present invention may be described, and a description of other portions may be omitted to avoid obscuring the subject matter of the present invention.

Figure 1:
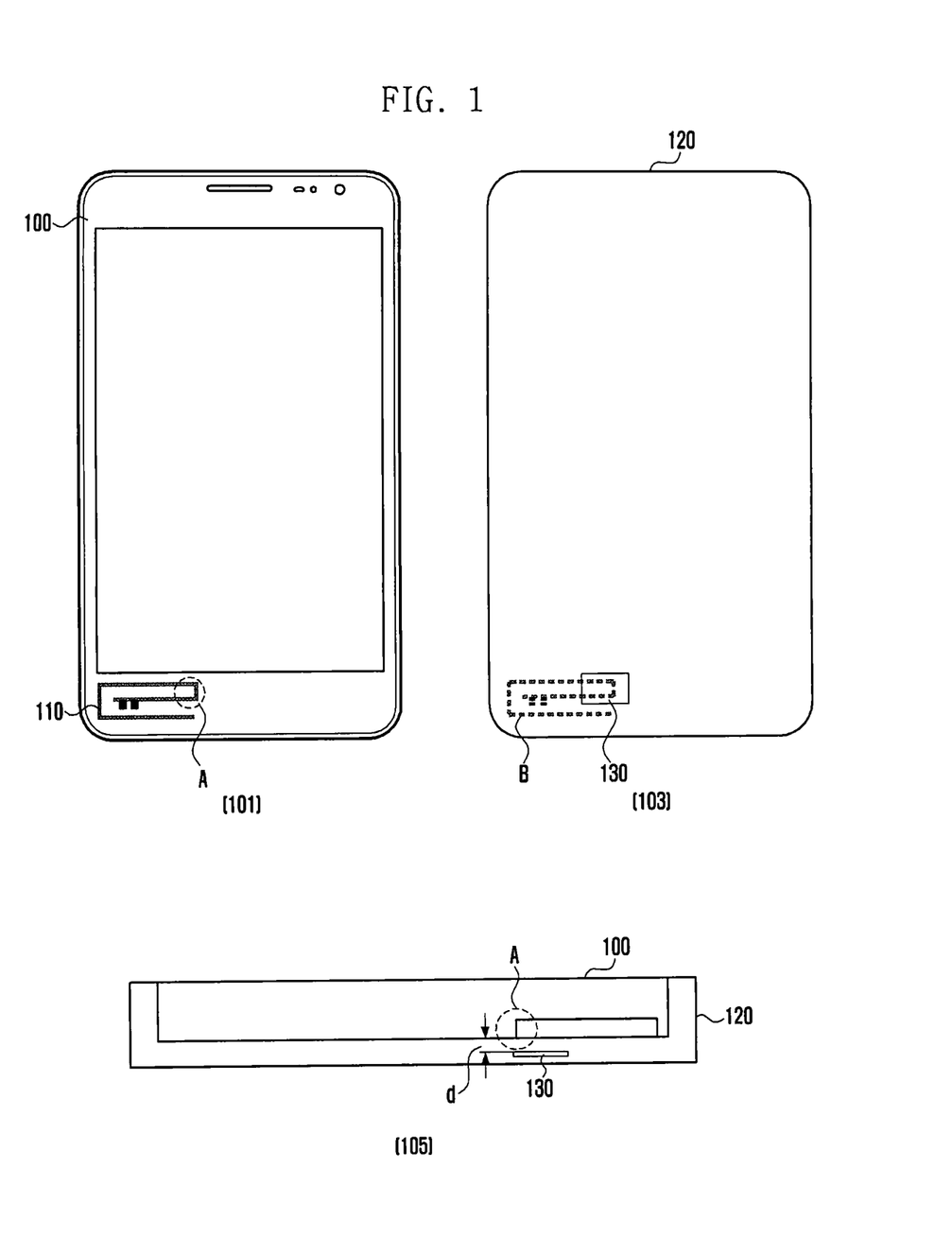
FIG. 1 is a diagram illustrating a portable electronic device and a portable electronic device cover according to an exemplary embodiment of the present invention.

FIG. 1 is a diagram illustrating a portable electronic device 100 and a portable electronic device cover according to an exemplary embodiment of the present invention.

As shown in 101, the portable electronic device 100 may house an antenna 110. When a communication function of the portable electronic device 100 is activated, the antenna 110 may radiate a signal to transmit to the air and receive a signal radiated to the air. Such an antenna 110 may be disposed at a lower portion of the portable electronic device 100. By disposing the antenna 110 at a lower portion of the portable electronic device 100, even in a state in which a user holds the portable electronic device 100, a user body may have a less influence on the antenna 110, and the antenna 110 may be separated farthest from a user head. However, a disposition of the antenna 110 within the portable electronic device 100 is not limited thereto and the antenna 110 may be disposed at an upper portion or the center of the portable electronic device 100.

When the portable electronic device 100 supports a plurality of communication methods, the antenna 110 may include at least two antenna patterns. The at least two antenna patterns may operate at each frequency domain within different resonant frequency bands, i.e., at different frequency domains. For example, when the antenna 110 includes two antenna patterns, one antenna pattern may operate at a relatively low frequency domain corresponding to 800 to 1000 Mhz, and the other antenna pattern may operate at a relatively high frequency domain corresponding to 1700 to 2500 Mhz. Such an antenna pattern may have various forms in length, volume, and shape according to a support communication method. For example, when the portable electronic device 100 supports a Global System for Mobile (GSM) communication method and a Wideband Code Division Multiple Access (WCDMA) 1 communication method, the antenna pattern may have a length, volume, and shape that supports the GSM communication method and may have a length, volume, and shape that supports the WCDMA1 communication method. Such an antenna 110 may be a Planer Inverted F Antenna (PIFA) type, Inverted F Antenna (IFA) type, or combination type thereof. However, such an antenna type is an illustration and the present invention is not limited thereto.

103 represents a portable electronic device cover 120 according to an exemplary embodiment of the present invention. The portable electronic device cover 120 may have a size that covers a circumferential edge of the portable electronic device 100. Further, in order to protect the portable electronic device 100 from an external impact or scratch, the portable electronic device cover 120 may be made of at least one of rubber, urethane, silicon, leather, synthetic leather, and fiber or a combination material thereof. However, this is an illustration and the portable electronic device cover 120 may be made of more various materials.

The portable electronic device cover 120 according to an exemplary embodiment of the present invention may include a conductive plate 130 inserted into the portable electronic device cover 120 or attached to be exposed to the outside of the portable electronic device cover 120. When the portable electronic device cover 120 is mounted in the portable electronic device 100, the conductive plate 130 may perform a function of improving a performance of the antenna 110. When producing the portable electronic device 100, a producer thereof designs the portable electronic device 100 to maximize an antenna performance in a state in which the portable electronic device cover 120 is not attached. When the portable electronic device cover 120 is mounted in the portable electronic device 100, the portable electronic device cover 120 made of a material having a high dielectric constant is located at a periphery of the antenna 110 and thus a change may occur in a resonant frequency band in which the antenna 110 operates. The conductive plate 130 minimizes movement of a resonant frequency band of the antenna 110 due to mounting of the portable electronic device cover 120, thereby reducing antenna performance deterioration.

In 103, a location of an antenna 110(B) designated by a dotted line represents an antenna pattern location relative to the portable electronic device cover 120 in a state in which the portable electronic device 100 is mounted in the portable electronic device cover 120. As shown in 103, when the portable electronic device cover 120 is mounted in the portable electronic device 100, the conductive plate 130 may be disposed within the portable electronic device cover 120 in a form that covers at least a portion of an antenna pattern of the antenna 110 (B) designated by a dotted line. The conductive plate 130 according to an exemplary embodiment of the present invention may be disposed within the portable electronic device cover 120 to cover a portion B, for example, a portion formed in a shape '⊏' or 'U', in which the antenna pattern is extended by folding or bending, as shown in 103. In this way, as the conductive plate 130 is disposed within the portable electronic device cover 120, radiation performance deterioration of the antenna 110 can be reduced. This will be described in detail hereinafter with reference to FIG. 2.

105 represents a side surface of a state in which the portable electronic device 100 is mounted in the portable electronic device cover 120 according to an exemplary embodiment of the present invention. As shown in 105, the conductive plate 130 may be disposed within the portable electronic device cover 120 with separated by a predetermined distance d in a form that covers a portion A in which an antenna pattern is extended by folding or bending. Here, a predetermined distance d in which the conductive plate 130 and the antenna pattern are separated may be exposed within the portable electronic device cover 120 or may be 1 mm or less. That is, the predetermined distance d may be 0-1 mm.

In an exemplary embodiment of the present invention, the portable electronic device cover 120 may be a battery pack or a view cover in addition to a protective cover for preventing damage of the portable electronic device 100. For example, the portable electronic device cover 120 may be implemented in a battery pack form for charging a battery within the portable electronic device 100. Further, the portable electronic device cover 120 may be formed in a view cover form that detaches an original cover of the portable electronic device 100 located at a rear surface of the portable electronic device 100 and attached to the portable electronic device 100. In this way, when the portable electronic device 100 is implemented in a battery pack or a view cover form, a length, volume, and shape of the conductive plate 130 may be adaptively formed to improve an antenna pattern performance.

Figure 2:
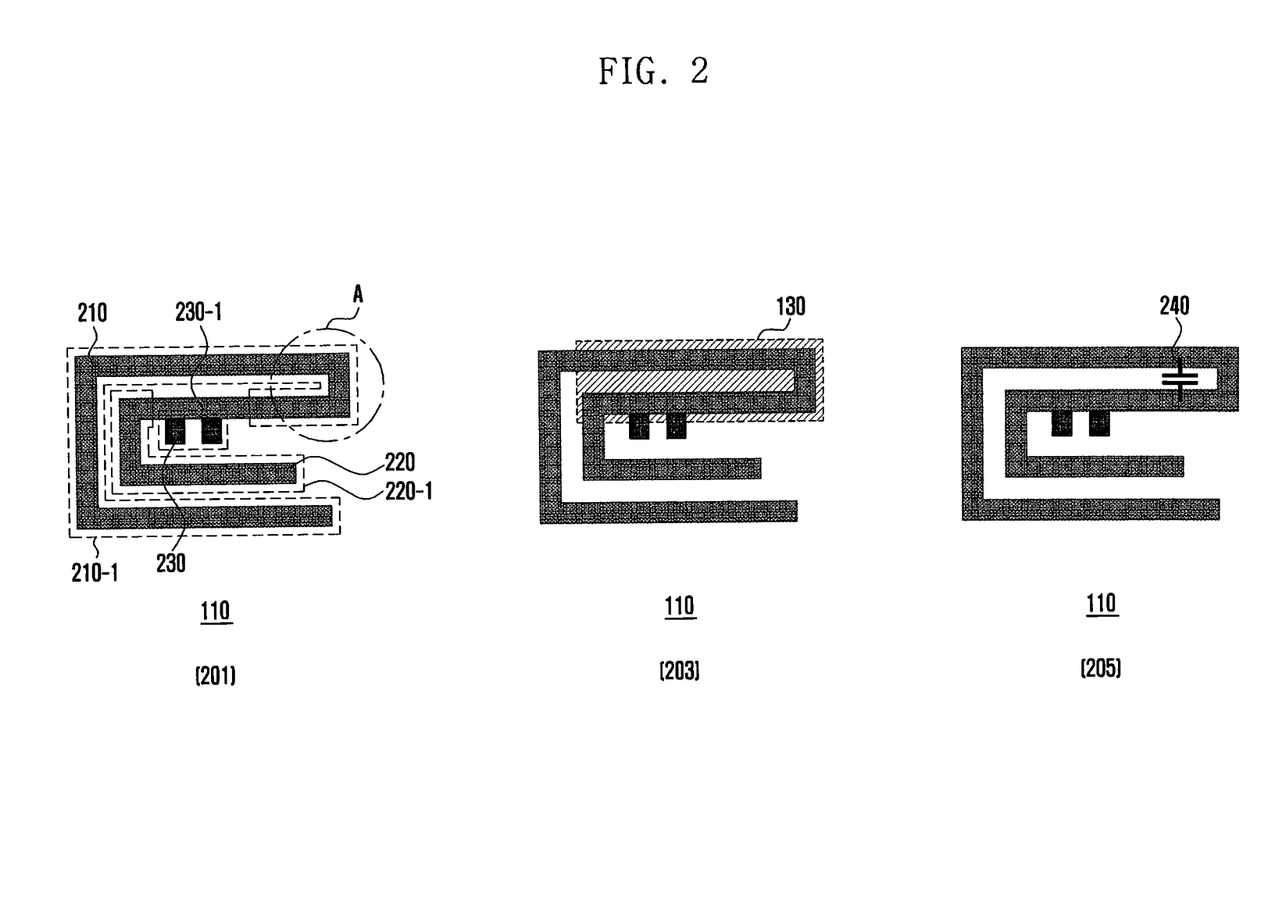
FIG. 2 is a diagram illustrating an antenna and a conductive plate according to an exemplary embodiment of the present invention.

FIG. 2 is a diagram illustrating an antenna and a conductive plate according to an exemplary embodiment of the present invention.

Referring to FIG. 2, the antenna 110 according to an exemplary embodiment of the present invention may include a first antenna pattern 210, second antenna pattern 220, and power supply unit 230.

The first antenna pattern 210 may radiate a signal in a relatively low resonant frequency band corresponding to 800 Mhz to 1000 Mhz. For example, according to a communication method in which the portable electronic device 100 supports, the first antenna pattern 210 may radiate a signal in a Global System for Mobile (GSM) communication band corresponding to 824 Mhz to 894 Mhz and an Extension of Global System for Mobile (EGSM) communication band corresponding to 880 Mhz to 960 Mhz. In 201, the first antenna pattern 210 may correspond to a portion 210-1 that encloses the outside of the antenna 110 from the power supply unit 230.

The second antenna pattern 220 may radiate a signal in a relatively high resonant frequency band corresponding to 1700 Mhz to 2500 Mhz. For example, according to a communication method in which the portable electronic device 100 supports, the second antenna pattern 220 may radiate a signal in a Digital Cordless System (DCS) communication band corresponding to 1710 Mhz to 1880 Mhz, a Personal Communication System (PCS) communication band corresponding to 1850 Mhz to 1990 Mhz, and a Wideband Code Division Multiple Access (WCDMA) 1 communication band corresponding to 1920 Mhz to 2170 Mhz. In 201, the second antenna pattern 220 may correspond to an area from a portion 230-1 including the power supply unit 230 to a portion 220-1 formed at the inside of the antenna 110.

In 201, a length and form of the first antenna pattern 210 and the second antenna pattern 220 are an illustration, and the first antenna pattern 210 and the second antenna pattern 220 may have various lengths and forms. Further, in 201, the antenna 110 includes the first antenna pattern 210 and the second antenna pattern 220, but the present invention is not limited thereto. In other words, the antenna 110 may include only one antenna pattern or at least three antenna patterns. For example, when the portable electronic device 100 supports only a GSM communication method, the antenna 110 may include only the first antenna pattern 210, and when the portable electronic device 100 supports a communication method having a resonant frequency band from 800 Mhz to 2500 Mhz, the antenna 110 may further include another antenna pattern in addition to the first antenna pattern 210 and the second antenna pattern 220.

203 overlappingly represents the conductive plate 130 disposed at the antenna 110 and the portable electronic device 100 in a state in which the portable electronic device 100 is mounted in the portable electronic device cover 120 according to an exemplary embodiment of the present invention. In 203, the conductive plate 130 may be disposed within the portable electronic device cover 120 with separated by a predetermined distance from the first antenna pattern 210 in a form that covers a portion of the first antenna pattern 210, for example, a portion in which the first antenna pattern 210 is extended by folding or bending.

By disposing the conductive plate 130 as shown in 203, when the portable electronic device 100 is mounted in the portable electronic device cover 120, a movement of a resonant frequency band, i.e., a resonant frequency band in which the first antenna pattern 210 operates can be prevented from moving to a lower frequency band. More specifically, for example, an electrical length of a dipole antenna is represented with Equation 1.

$$\text{Electrical length of antenna pattern} = \frac{\lambda}{4} = C \Big/ (4f * \sqrt{\varepsilon * \mu}) \quad \text{[Equation 1]}$$

(where $\lambda$ is a wavelength, C is a velocity of light, f is a resonant frequency, $\varepsilon$ is a dielectric constant, and $\mu$ is magnetic permeability).

In Equation 1, when the portable electronic device 100 is mounted in the portable electronic device cover 120, a dielectric constant $\varepsilon$ of the first antenna pattern 210 may increase due to the portable electronic device cover 120. When an electrical length, magnetic permeability $\mu$, and light velocity C of the first antenna pattern 210 are a fixed value, the resonant frequency f may reduce with increase of the dielectric constant $\varepsilon$ of the first antenna pattern 210.

However, according to an exemplary embodiment of the present invention, as shown in 203, when the conductive plate 130 is disposed at a first antenna pattern area 210-1, an electrical length of the first antenna pattern 210 can be reduced. In other words, in Equation 1, when the dielectric constant $\varepsilon$, magnetic permeability $\mu$, and light velocity C are fixed, an electrical length of the first antenna pattern 210 is inversely proportional to the resonant frequency f. Therefore, as an electrical length of the first antenna pattern 210 reduces, a resonant frequency may increase. Accordingly, the conductive plate 130 prevents a resonant frequency band in which the first antenna pattern 210 operates from moving to a lower frequency band, thereby preventing a radiation performance of the first antenna pattern 210 from deteriorating. Particularly, the conductive plate 130 may be disposed within the portable electronic device cover 120 with separated by a predetermined distance from the first antenna pattern 210 in a form that covers a portion in which the first antenna pattern 210 is extended by folding or bending. As the conductive plate 130 is disposed in a form that covers a portion in which the first antenna pattern 210 is extended by folding or bending, compared with a case in which the conductive plate 130 is disposed in a form that covers a constantly extended first antenna pattern portion, the conductive plate 130 can further improve a performance of the first antenna pattern 210.

205 represents an effect according to disposition of the conductive plate 130 shown in 203. More specifically, as the conductive plate 130 is disposed as shown in 203, a capacitor 240 is connected between the first antenna pattern 210, i.e., a capacitance component occurs between the first antenna pattern 210. Accordingly, an electrical length of the first antenna pattern 210 can be reduced. Particularly, as the conductive plate 130 is disposed within the portable electronic device cover 120 with separated by a predetermined distance from the first antenna pattern 210 in a form that covers a portion in which the first antenna pattern 210 is extended by folding or bending, compared with a case in which the conductive plate 130 is disposed in a form that covers a constantly extended antenna pattern portion, the conductive plate 130 can considerably reduce an electrical length of the first antenna pattern 210.

In FIG. 2, in a relationship with the first antenna pattern 210, the conductive plate 130 is illustrated. This is because when the portable electronic device 100 is mounted in the portable electronic device cover 120, the first antenna pattern 210 operating in a resonant frequency band of a low frequency band is largely affected, compared with a resonant frequency band of a high frequency band in relation to a change of a dielectric constant of the antenna 110. Therefore, it will become apparent to a person of ordinary skill in the art that the present invention may be applied to the second antenna pattern 220 operating in a resonant frequency band of a high frequency band. Further, a performance improving effect of the antenna 110 by the conductive plate 130 may be independent according to the first antenna pattern 210 and the second antenna pattern 220. Therefore, at least two conductive plates 130 may be disposed on each antenna pattern according to an exemplary embodiment.

Figure 3:
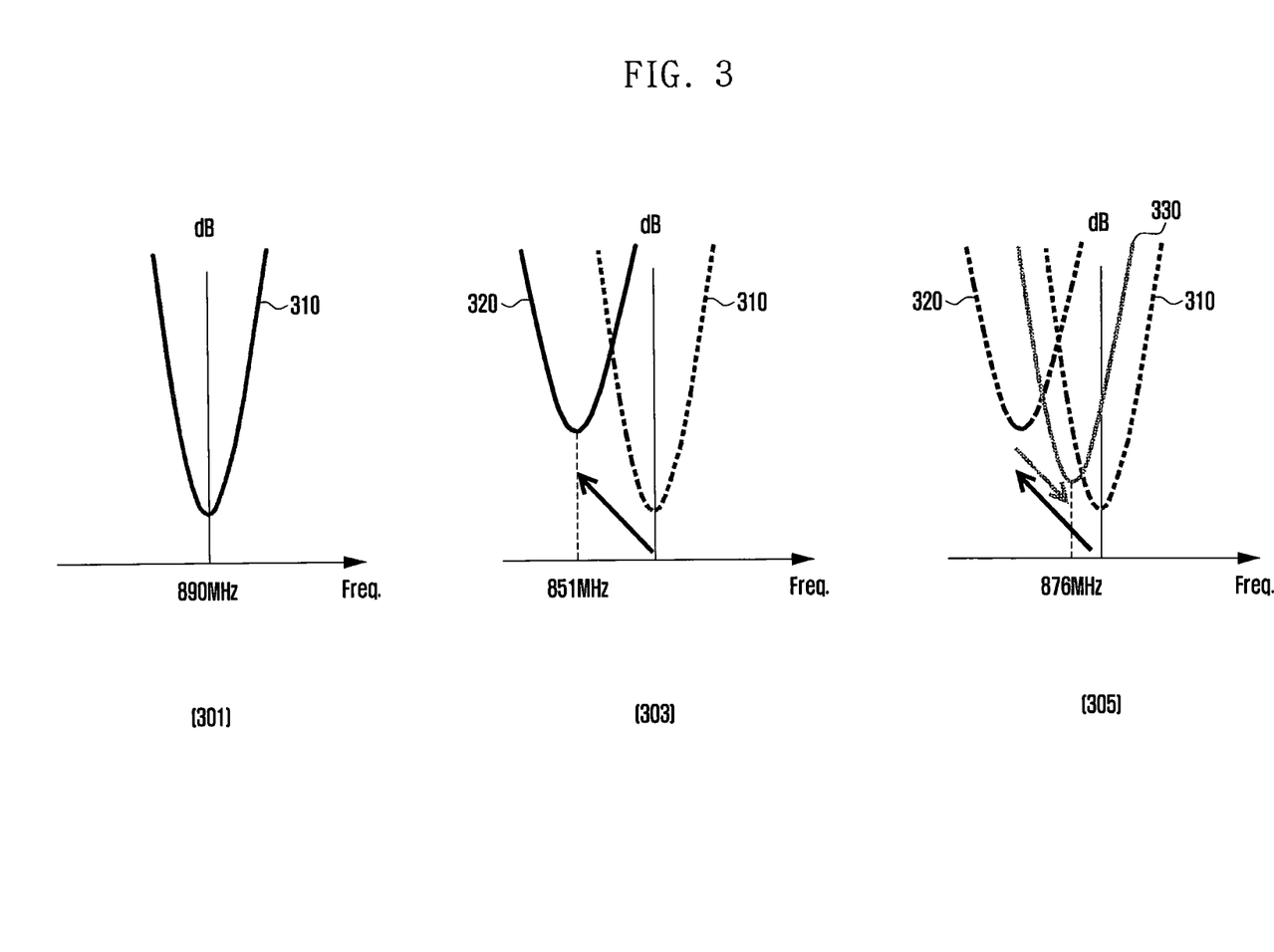
FIG. 3 is a graph illustrating movement of a resonant frequency when mounting a portable electronic device cover according to an exemplary embodiment of the present invention.

FIG. 3 is a graph illustrating movement of a resonant frequency when mounting a portable electronic device cover according to an exemplary embodiment of the present invention.

Referring to FIG. 3, in 301, 310 is a graph representing a resonant frequency band in a state in which the portable electronic device 100 is not mounted in the portable electronic device cover 120. In 301, when a communication method in which the portable electronic device 100 supports is EGSM, a resonant frequency band may be formed in about 890 Mhz.

However, in 303, when the portable electronic device 100 is mounted in the portable electronic device cover 120 not including a metal plate, in a graph 320, it can be seen that a resonant frequency band may be formed in about 851 Mhz smaller than 890 Mhz. Therefore, in an Extension of Global System for Mobile (EGSM) communication method, Total Isotropic Sensitivity (TIS) representing a receiving performance of the antenna 110 may be considerably reduced.

In 305, when the portable electronic device 100 is mounted in the portable electronic device cover 120 including a metal plate, in a graph 330, a resonant frequency band may be formed in about 876 Mhz larger than 851 Mhz. Accordingly, compared with a case in which the portable electronic device 100 is mounted in the portable electronic device cover 120 not including the conductive plate 130, by minimizing a movement of a resonant frequency, performance deterioration of the antenna 110 can be reduced.

FIG. 4 is a graph and table illustrating an antenna performance change when mounting a portable electronic device cover according to an exemplary embodiment of the present invention.

Figure 4A:
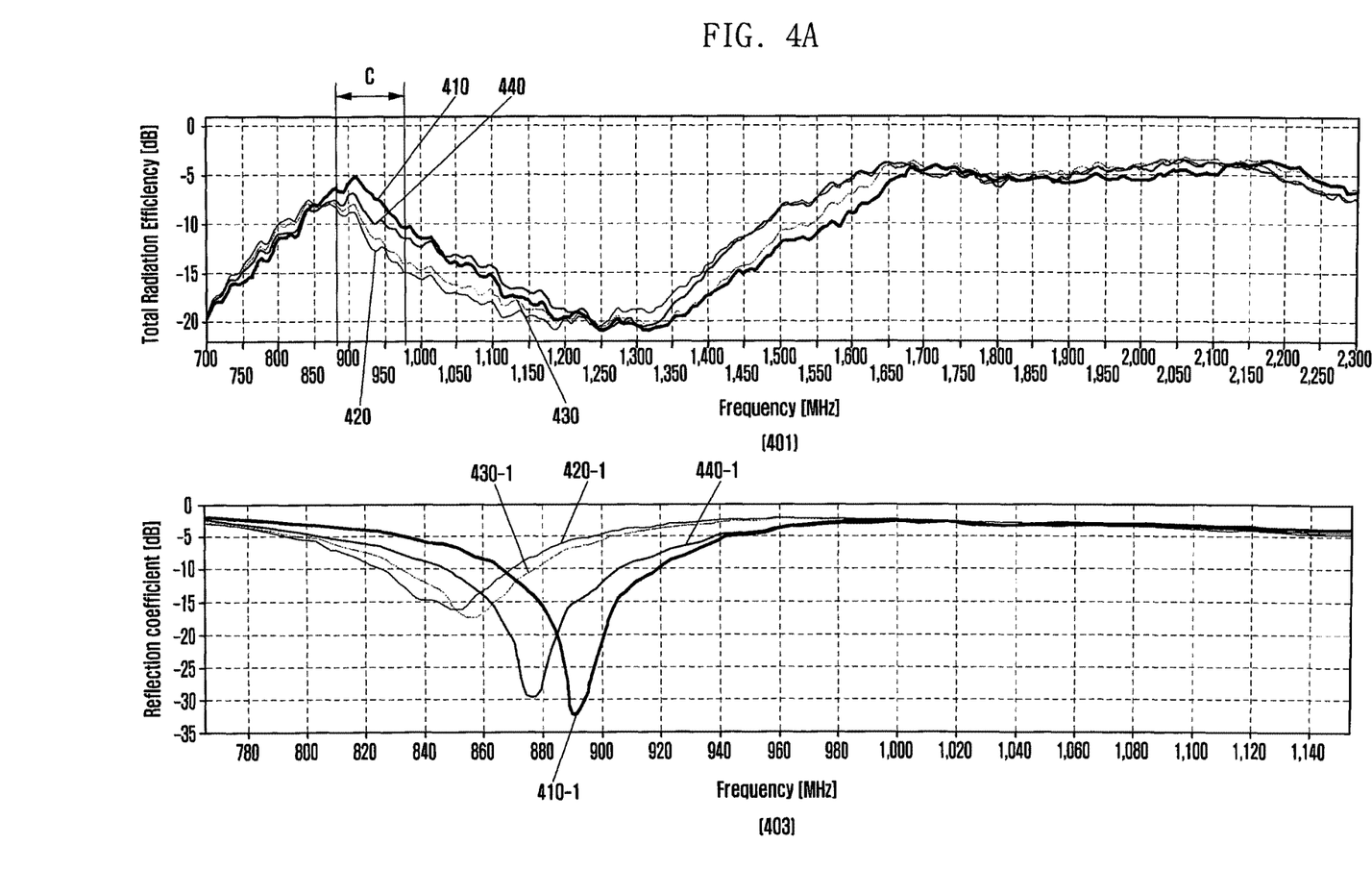
FIG. 4 is a graph and table illustrating an antenna performance change when mounting a portable electronic device cover according to an exemplary embodiment of the present invention.

Referring to FIG. 4, 401 of FIG. 4A illustrates graphs representing total radiation efficiency of the antenna 110, i.e., a rate of a signal amount actually radiated to the air to a signal amount input to the antenna 110. In 401, compared with a resonant frequency band segment C corresponding to an EGSM communication method, when the portable electronic device 100 is not mounted in the portable electronic device cover 120, in a graph 410, it can be seen that radiation efficiency is largest in an entire frequency band. However, when the portable electronic device 100 is mounted in the portable electronic device cover 120, in a graph 420, radiation efficiency is generally low at an entire segment, and particularly, at a resonant frequency band segment C corresponding to an EGSM communication method, it can be seen that radiation efficiency is further lowered, compared with other graphs.

When securing a physical space within a conventional portable electronic device cover 120, compared with the graph 420 of a case in which the portable electronic device 100 is mounted in the portable electronic device cover 120, a graph 430 represents that radiation efficiency increases a little. However, as can be seen in a graph 440 of a case in which the portable electronic device 100 according to an exemplary embodiment of the present invention is mounted in the portable electronic device cover 120 including the conductive plate 130, compared with the graph 420 of a case in which the portable electronic device 100 is mounted in the portable electronic device cover 120 and the graph 430 of a case of securing a physical space within the conventional portable electronic device cover 120, it can be seen that radiation efficiency is increased.

403 of FIG. 4A is graphs representing a reflection coefficient of the antenna 110, i.e., a rate of a returned signal amount (a reflected wave) to a signal amount (e.g., incident wave) input to the antenna 110. In 403, in a case in which the portable electronic device 100 is not mounted in the portable electronic device cover 120, in a graph 410-1, it can be seen that a resonant frequency band of about 890 Mhz has a lowest reflection coefficient value. However, when the portable electronic device 100 is mounted in the portable electronic device cover 120, in a graph 420-1, a resonant frequency band is formed about 851 Mhz and thus compared with a case in which the portable electronic device 100 is not mounted in the portable electronic device cover 120, it can be seen that a resonant frequency band is very lowly formed, and it can be seen that a resonant frequency band of about 851 Mhz has a very large reflection coefficient value. When securing a physical space within the conventional portable electronic device cover 120, in a graph 430-1, it can be seen that a resonant frequency band is formed about 855 Hz and has a large reflection coefficient value. However, when the portable electronic device 100 according to an exemplary embodiment of the present invention is mounted in the portable electronic device cover 120 including the conductive plate 130, as can be seen in a graph 440-1, compared with the graph 420-1 of a case in which the portable electronic device 100 is mounted in the portable electronic device cover 120 and the graph 430-1 of a case in which the portable electronic device 100 secures a physical space within the conventional portable electronic device cover 120, a resonant frequency band is formed about 876 Mhz and a reflection coefficient value is largely lowered, and thus it can be seen that performance deterioration of the antenna 110 can be minimized.

Figure 4B:
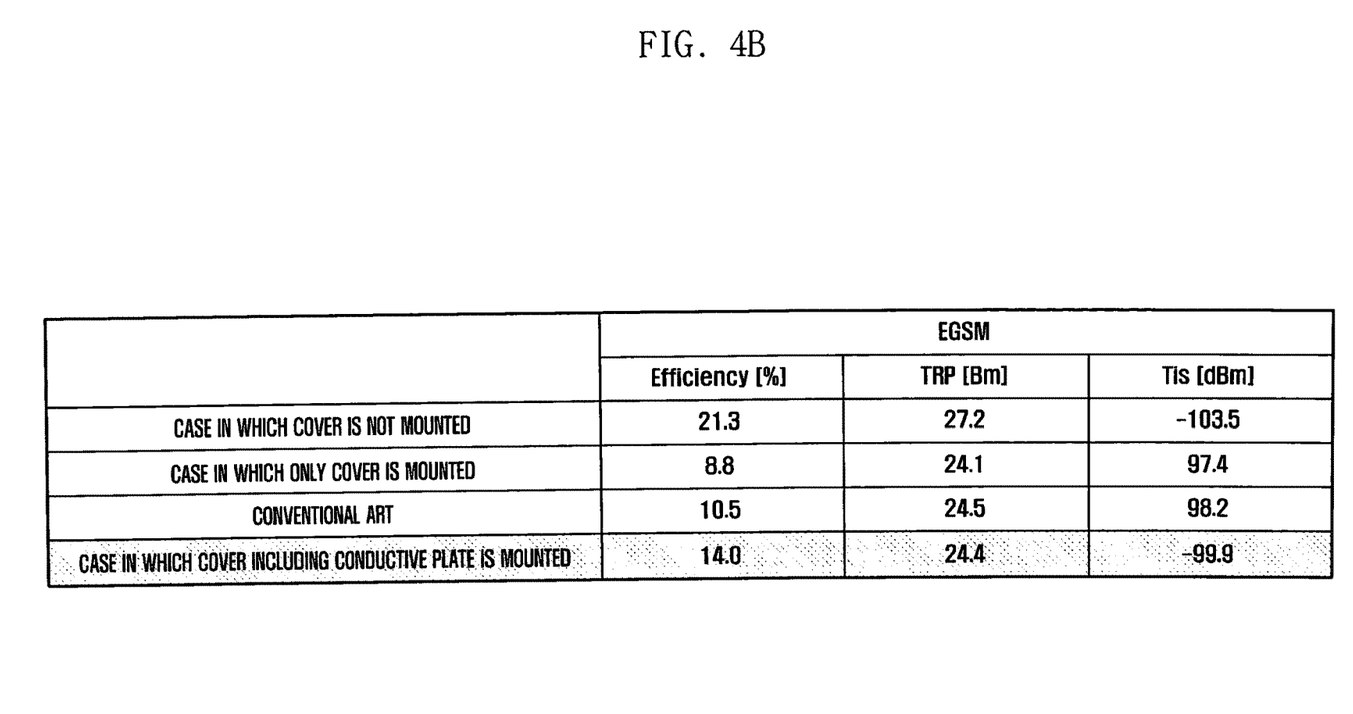

FIG. 4B represents a Table comparing antenna efficiency, Total Radiated Power (TRP) as a transmitting performance, and Total Isotropic Sensitivity (TIS) as a receiving performance in a case in which the portable electronic device 100 is not mounted in the portable electronic device cover 120, a case in which the portable electronic device 100 is mounted in the portable electronic device cover 120, a case of securing a physical space within the portable electronic device 100 as the conventional art, and a case of mounting the portable electronic device cover 120 including the conductive plate 130 according to an exemplary embodiment of the present invention, in an EGSM communication method of the portable electronic device 100.

In FIG. 4B, compared with a case in which the portable electronic device 100 is mounted in the portable electronic device cover 120 and a case of securing a physical space within the portable electronic device 100 as the conventional art, in a case of mounting the portable electronic device cover 120 including the conductive plate 130, it can be seen that antenna efficiency increases. Further, in TIS as a receiving performance of the antenna 110, in a case in which the portable electronic device 100 is mounted in the portable electronic device cover 120, a performance is deteriorated by 6.1 dB, compared with a case in which the portable electronic device 100 is not mounted in the portable electronic device cover 120, but in a case of mounting the portable electronic device cover 120 including the conductive plate 130, it can be seen that a performance is enhanced by 2.5 dB.

Figure 5:
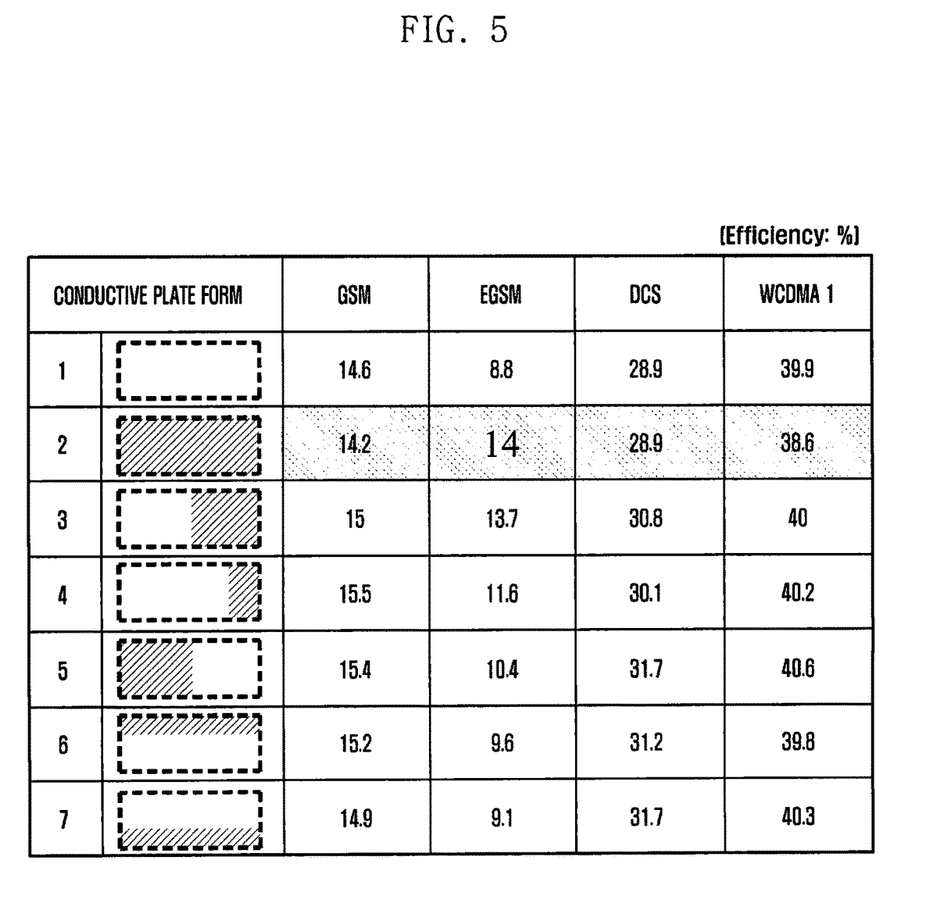
FIG. 5 is a table comparing an antenna performance according to a form of a conductive plate according to an exemplary embodiment of the present invention.

FIG. 5 is a table comparing an antenna performance according to a form of the conductive plate 130 according to an exemplary embodiment of the present invention.

Referring to FIGS. 2 and 5, a horizontal axis of the table represents a GSM communication method and an EGSM communication method operating in a relatively low resonant frequency band and a DCS communication method and a WCDMA1 communication method operating in a relatively high resonant frequency band. A vertical axis of the table represents a form such as a location and area of the conductive plate 130 according to an exemplary embodiment of the present invention. It is assumed that the conductive plate 130 is disposed in a form that covers a portion of the first antenna pattern 210 that radiates a signal in a resonant frequency band of a low frequency band. In FIG. 5, 1 represents a case in which the portable electronic device 100 is not mounted in the portable electronic device cover 120. 2 represents a case in which the conductive plate 130 is disposed in a form that covers an entire upper portion of the first antenna pattern 210 of 203 by including a portion in which the first antenna pattern 210 is extended by folding or bending, as shown in 203 of FIG. 2. 3 represents a case in which the conductive plate 130 is disposed in a form that covers a half of an upper portion of the first antenna pattern 210 by including a portion in which the first antenna pattern 210 is extended by folding or bending. 4 represents a case in which the conductive plate 130 is disposed in a form that covers only a portion in which the first antenna pattern 210 is extended by folding or bending. 5 represents a case in which the conductive plate 130 is disposed in a form that covers a half of an upper area of the first antenna pattern 210 by not including a portion in which the first antenna pattern 210 is extended by folding or bending. 6 represents a case in which the conductive plate 130 is disposed in a form that covers only an upper portion of the first antenna pattern 210 of 203, and 7 represents a case in which the conductive plate 130 is disposed in a form that covers only a lower portion of the first antenna pattern 210 of 203.

In the table of FIG. 5, it can be seen that the second conductive plate 130 having a size and location has largest efficiency in an EGSM communication method. Compared with the third conductive plate 130 and the fifth conductive plate 130, it can be seen that the third conductive plate 130 having an area corresponding to a portion in which the first antenna pattern 210 is extended by folding or bending has large efficiency. Compared with the third conductive plate 130 and the fourth conductive plate 130, it can be seen that when the conductive plate 130 is disposed in a form that covers a predetermined area or more of a portion in which the first antenna pattern 210 is extended by folding or bending, the conductive plate 130 has large efficiency. Further, it can be seen that the sixth conductive plate 130 and the seventh conductive plate 130 in which the conductive plate 130 have no area corresponding to a portion in which the first antenna pattern 210 is extended by folding or bending have lowest efficiency, except for a case of the first conductive plate 130. In this way, it can be seen that the conductive plate 130 according to an exemplary embodiment of the present invention having a predetermined area or more by including a portion in which the first antenna pattern 210 is extended by folding or bending have largest antenna efficiency.

As described above, a portable electronic device cover according to various exemplary embodiments of the present invention improves a performance of the antenna 110 mounted within the portable electronic device 100, thereby providing excellent usability.

The portable electronic device 100 may include various modules according to a providing form in addition to the antenna 110. That is, the portable electronic device 100 may further include constituent elements that are not described above, such as a short range communication module for short range communication, interface for data transmission and reception by a wire communication method or a wireless communication method of the portable electronic device 100, Internet communication module that performs an Internet function by communicating with an Internet network, and digital broadcasting module that performs digital broadcasting receiving and reproducing functions. Such constituent elements may be very variously changed according to a convergence trend of a digital device, and a constituent element of a level equivalent to that of the foregoing constituent elements may be further included in the device. Further, the portable electronic device 100 according to the present exemplary embodiment may exclude a specific constituent element from the configuration or may replace a specific constituent element with another constituent element according to a providing form. This may be easily understood to a person of ordinary skill in the art.

Exemplary embodiments disclosed in this specification and drawings are suggested as a specific example to easily describe the present invention and to help understanding thereof and do not limit the scope of the present invention. Therefore, it should be understood that changes and variations obtained based on the spirit and scope of the present invention in addition to exemplary embodiments disclosed herein are included in the scope of the present invention.

The invention claimed is:

1. A portable electronic device cover, comprising:
a conductive plate separated by a predetermined distance from an antenna mounted in a portable electronic device and disposed at a location overlapped with at least a portion of the antenna, when the portable electronic device is mounted in the portable electronic device cover,
wherein the antenna comprises a first antenna pattern and a second antenna pattern, and
an electrical length of the first antenna pattern is reduced when the portable electronic device is mounted in the portable electronic device cover.

2. The portable electronic device cover of claim 1, wherein the
first antenna pattern radiates a signal in a resonant frequency band corresponding to any one of a Global System for Mobile (GSM) communication method and an Extension of Global System for Mobile (EGSM) communication method, and the second antenna pattern radiates a signal in a resonant frequency band corresponding to any one of a Digital Cordless System (DCS) communication method, Personal Communication System (PCS) communication method, and Wideband Code Division Multiple Access (WCDMA) 1 communication method.

3. The portable electronic device cover of claim 2, wherein the conductive plate is disposed at a location overlapped with a portion in which the first antenna pattern is formed by folding or bending.

4. The portable electronic device cover of claim 1, wherein the predetermined distance is exposed at a portable electronic device cover surface that contacts with the portable electronic device and is 1 mm or less.

5. The portable electronic device cover of claim 1, wherein the portable electronic device cover is a battery pack that charges a battery of the portable electronic device.

6. The portable electronic device cover of claim 1, wherein the portable electronic device cover is a view cover that mounts the portable electronic device in a state in which a cover of the portable electronic device is detached.

7. The portable electronic device cover of claim 1, wherein the portable electronic device cover is made of at least one of rubber, urethane, silicon, leather, synthetic leather, and fiber or a combination material thereof.

8. The portable electronic device cover of claim 2, wherein a resonant frequency in which the first antenna pattern operates increases, as the portable electronic device is mounted in the portable electronic device cover comprising the conductive plate.

9. The portable electronic device cover of claim 2, wherein the conductive plate is disposed at a location overlapped with a portion in which the second antenna pattern is formed by folding or bending.

* * * * *